US008814737B2

(12) United States Patent
Ishizuka

(10) Patent No.: US 8,814,737 B2
(45) Date of Patent: Aug. 26, 2014

(54) WHEEL DRIVING DEVICE

(75) Inventor: Masayuki Ishizuka, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 135 days.

(21) Appl. No.: 13/587,232

(22) Filed: Aug. 16, 2012

(65) Prior Publication Data

US 2013/0053209 A1   Feb. 28, 2013

(30) Foreign Application Priority Data

Aug. 23, 2011   (JP) ................................. 2011-181864

(51) Int. Cl.
*B60K 1/00* (2006.01)
*F16H 1/32* (2006.01)
*B60B 27/00* (2006.01)
*F16C 33/78* (2006.01)
*F16C 19/16* (2006.01)
*B60K 7/00* (2006.01)

(52) U.S. Cl.
CPC ......... *F16C 33/7876* (2013.01); *B60B 27/0073* (2013.01); *B60K 7/0007* (2013.01); *F16C 2361/61* (2013.01); *F16C 2326/02* (2013.01); *F16C 19/163* (2013.01)
USPC ........... 475/162; 475/161; 475/159; 475/168; 475/176; 475/177; 180/65.6; 384/477

(58) Field of Classification Search
CPC ................... B60K 7/0007; B60K 2007/0038; B60K 2007/0092; B60K 17/046; B60K 1/00; B60K 1/02; B60K 17/10; B60K 17/356; F16H 1/32; F16H 25/06; F16H 25/2001; F16H 25/2881; F16H 2001/328; F16H 1/14; F16C 19/18; F16C 19/181; F16C 19/183; F16C 19/185

USPC ................... 180/65.51, 65.6, 308; 310/67 R; 301/6.5; 475/159, 162, 168, 176, 177, 475/178, 179
See application file for complete search history.

(56) References Cited

U.S. PATENT DOCUMENTS

| | | | |
|---|---|---|---|
| 2005/0105840 A1* | 5/2005 | Muranaka et al. ............ 384/544 |
| 2009/0000840 A1* | 1/2009 | Murata ........................ 180/65.5 |
| 2010/0119186 A1 | 5/2010 | Fukumura et al. |
| 2011/0000394 A1* | 1/2011 | Miki et al. ...................... 105/96 |
| 2011/0011203 A1 | 1/2011 | Yamamoto et al. |

FOREIGN PATENT DOCUMENTS

| | | |
|---|---|---|
| DE | 4017764 A | 12/1991 |
| JP | 2008081090 A | 4/2008 |
| JP | 2010-159794 A | 7/2010 |

OTHER PUBLICATIONS

EP Search Report for EP Application No. 12006024.9, dated Jan. 10, 2013.

* cited by examiner

Primary Examiner — Edwin A Young
Assistant Examiner — Colby M Hansen
(74) Attorney, Agent, or Firm — Squire Patton Boggs (US) LLP

(57) ABSTRACT

A wheel driving device includes: a reduction mechanism of which at least a part is disposed on an inside of a wheel; a casing; a relative rotation member rotating relative to the casing; a bearing disposed between the casing and the relative rotation member; and an oil seal sealing a space where the reduction mechanism is present, wherein an outer race of the bearing includes a main body portion of which an outer periphery is disposed on an inside of the casing, and an extending portion which extends from the main body portion in an axial direction and of which an outer periphery is exposed from the casing, and the oil seal abuts on the extending portion and the relative rotation member.

14 Claims, 2 Drawing Sheets

WHEEL DRIVING DEVICE

BACKGROUND

1. Technical Field

The present invention relates to a wheel driving device that drives the wheels of a vehicle.

Priority is claimed on Japanese Patent Application No. 2011-181864, filed on Aug. 23, 2011, the entire content of which is incorporated herein by reference.

2. Description of the Related Art

A device that drives the wheels of a forklift truck is disclosed in the related art.

In the wheel driving device, a part of the reduction mechanism is disposed on the inside of a wheel.

SUMMARY

According to an embodiment of the present invention, there is provided a wheel driving device including: a reduction mechanism of which at least a part is disposed on the inside of a wheel; a casing; a relative rotation member rotating relative to the casing; a bearing disposed between the casing and the relative rotation member; and an oil seal sealing a space where the reduction mechanism is present, wherein the outer race of the bearing includes a main body portion of which an outer periphery is disposed on the inside of the casing, and an extending portion which extends from the main body portion in an axial direction and of which an outer periphery is exposed from the casing, and the oil seal abuts on the extending portion and the relative rotation member.

DETAILED DESCRIPTION

As such, in the wheel driving device in which at least a part of the reduction mechanism is disposed on the inside of the wheel, achieving a high transmission capacity while accommodating (at least the part of) the reduction mechanism in the internal space of the narrow wheel becomes an important subject.

It is desirable to achieve a higher transmission capacity to a wheel driving device, in the wheel driving device in which at least a part of a reduction mechanism is disposed on the inside of a wheel.

In a case where the oil seal is disposed on the inside in the radial direction of the casing, in order for the bearing to be assembled to the inside in the axial direction of the oil seal, the inner diameter of an oil seal disposition surface of the casing needs to be greater than the outer diameter of the outer race of the bearing. In addition, in order to ensure the strength of the casing, the casing needs to be a predetermined thickness.

Therefore, regarding the disposition of the reduction mechanism on the inside in the radial direction of the wheel, if there is a limitation to the size of the outer diameter of the casing, inevitably, the outer diameter of the outer race (the diameter of the bearing) has to be reduced, and the transmission capacity that can be achieved is reduced.

According to the embodiment of the present invention, since the outer race of the bearing extends to dispose the oil seal on the inside of the extending portion exposed from the casing, the diameter of the bearing is not influenced by the inner diameter of the oil seal disposition surface of the casing. Therefore, the diameter of the bearing may be increased, so that a higher transmission capacity may be achieved.

According to the embodiment of the present invention, in the wheel driving device in which at least a part of the reduction mechanism is disposed on the inside of the wheel, a higher transmission capacity of the wheel driving device may be achieved.

Hereinafter, an example of an embodiment of the present invention will be described in detail with reference to the drawings.

Figure 1:
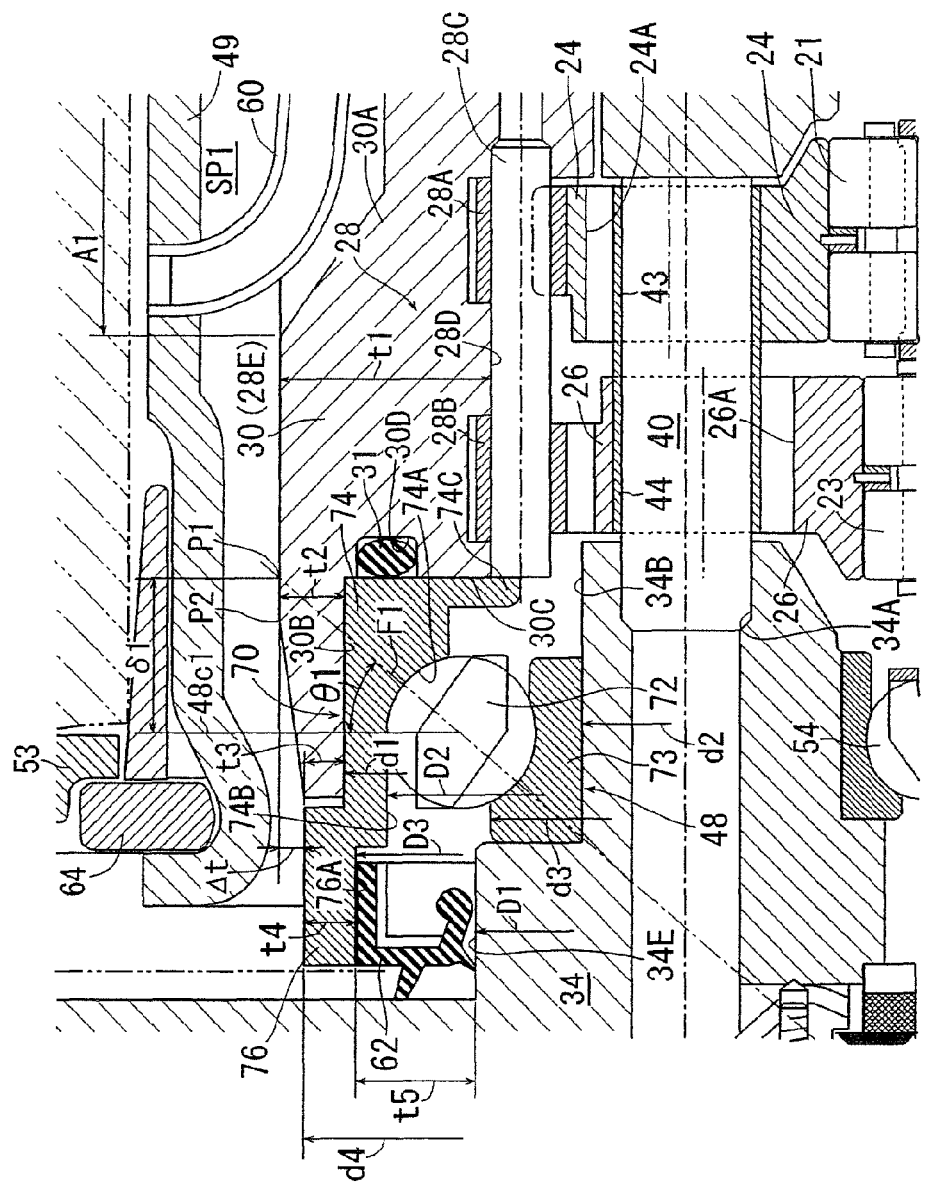
FIG. 1 is a cross-sectional view of the main part illustrating a configuration example in which a wheel driving device according to an example of an embodiment of the present invention is applied to a wheel driving device of a forklift truck.
Figure 2:
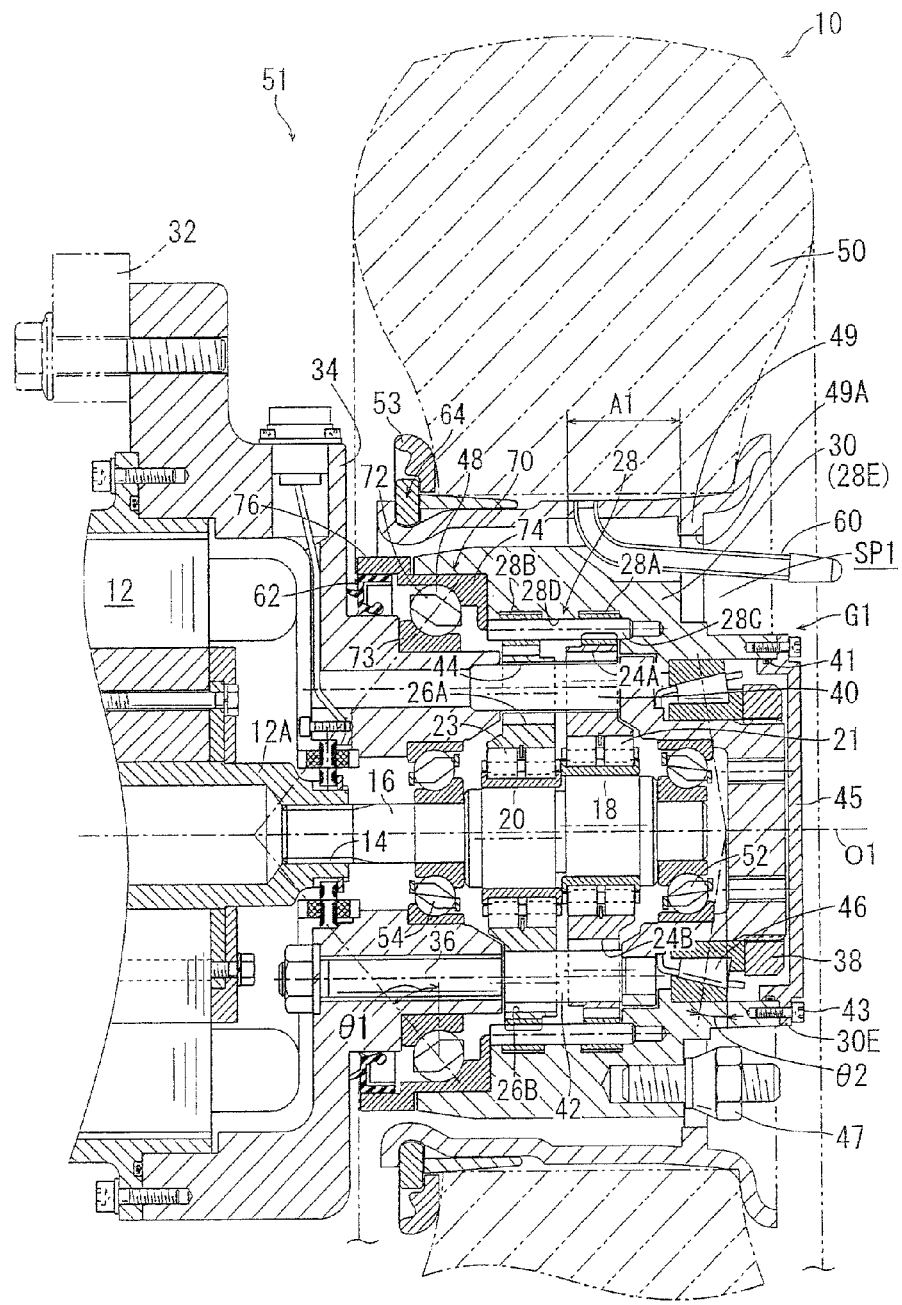
FIG. 2 is an overall cross-sectional view of FIG. 1.

FIG. 1 is a cross-sectional view of the main part illustrating a configuration example in which a wheel driving device according to an example of an embodiment of the present invention is applied to a wheel driving device of a forklift truck. FIG. 2 is an overall cross-sectional view of FIG. 1.

The wheel driving device 10 includes a motor 12 and a reduction mechanism G1 that reduces the rotation of the motor 12.

In this embodiment, the entirety of the reduction mechanism G1 is disposed on the inside of a wheel (tire) 50.

In the wheel driving device 10, a flange body (relative rotation member) 34 described later is fixed to a vehicle body frame 32, and a casing 30 which is an output member of the reduction mechanism G1 rotates relatively to the flange body 34 fixed to the vehicle body frame 32. The wheel 50 rotates integrally with the casing 30.

Hereinafter, detailed description will be provided.

An output shaft 12A of the motor 12 is connected to an input shaft 16 of the reduction mechanism G1 via a spline 14. In this embodiment, as the reduction mechanism G1, an eccentric oscillation-type planetary gear reduction mechanism having external gears 24 and 26 which are planetary gears and an internal gear 28 which makes internal contact and meshes with the external gears 24 and 26 is employed.

The input shaft 16 of the reduction mechanism G1 is disposed at the center (the position of the axial center O1) in the radial direction of the reduction mechanism G1. Two eccentric bodies 18 and 20 having axial centers offset from that of the input shaft 16 are formed integrally with the input shaft 16. The external gears 24 and 26 are externally fitted in the outer peripheries of the eccentric bodies 18 and 20 via bearings 21 and 23, respectively. The internal gear 28 makes an internal contact and mesh with the external gears 24 and 26.

The internal gear 28 mainly includes cylindrical internal pins 28A and 28B constituting the internal teeth, a holding pin 28C which penetrates through and rotatably holds the internal pins 28A and 28B, a holding pin groove 28D rotatably supporting the holding pin 28C, and an internal gear main body 28E integrated into a casing 30. The holding pin groove 28D basically functions as an assembly groove of the internal pins 28A and 28B.

The number of internal teeth of the internal gear 28 (the number of internal pins 28A and 28B) is slightly greater than the number of external teeth of the external gears 24 and 26 (in this embodiment, by only 1).

In addition, on the vehicle body side in the axial direction of the external gears 24 and 26, the flange body 34 fixed to the vehicle body frame 32 is disposed, and on the side opposite to the vehicle body in the axial direction, a carrier body 38 integrated into the flange body 34 via a carrier bolt 36 and a carrier pin 42 is disposed. An inner pin 40 is formed integrally with the carrier body 38.

The inner pin 40 penetrates through inner pin holes 24A and 26A formed to penetrate through the external gears 24 and 26 with a clearance, along with a sliding augmentation member 44. The tip end of inner pin 40 is fitted into a concave portion 34A of the flange body 34. The inner pin 40 abuts on a part of the inner pine holes 24A and 26A of the external gears 24 and 26 via the sliding augmentation member 44 and restricts the rotation of the external gears 24 and 26 (allows only oscillation).

The carrier pin 42 penetrates through carrier pin holes 24B and 26B formed to penetrate through the external gears 24 and 26 with a clearance and abuts on the end portion in the axial direction of the flange body 34. Here, the carrier pin 42 does not abut on the carrier pin holes 24B and 26B of the external gears 24 and 26 and does not contribute to the restriction of the rotation of the external gears 24 and 26.

The input shaft 16 of the reduction device G1 is rotatably supported by the flange body 34 and the carrier body 38 via a pair of angular ball bearings 52 and 54.

The casing 30 which is the output member of the reduction device G1 is rotatably supported by the flange body (the relative rotation member rotating relative to the casing) 34 and the carrier body 38, via a tapered roller bearing 46 positioned on the outside in the axial direction (the side opposite to the vehicle body) and an angular ball bearing 48 positioned on the inside in the axial direction (the vehicle body side). The flange body 34 is fixed to the vehicle body frame 32.

A first wheel member 49 is connected to the end surface of the casing 30 on the side opposite to the vehicle body in the axial direction by a bolt 47, and the wheel (tire) 50 of the forklift truck (illustration of the entirety thereof is omitted) 51 is mounted via the first wheel member 49.

That is, in this embodiment, the flange body 34 (which is the relative rotation member rotating relative to the casing 30) is fixed to the vehicle body frame 32, and as the casing 30 is rotated, the wheel 50 fixed to the casing 30 is driven. The angular ball bearing 48 corresponds to a bearing disposed between the casing 30 and the flange body 34 which is the relative rotation member.

In addition, in this embodiment, the outer diameter of the tapered roller bearing 46 is smaller than the outer diameter of the angular ball bearing 48. In addition, in a space SP1 on the outside in the diameter direction of the tapered roller bearing 46 having the small outer diameter, a tube 60 for air injection is disposed.

The tube 60 is bent toward the side opposite to the vehicle body, is accommodated in a cutoff 30A formed in the axial direction at a part of the casing 30 in the circumferential direction, penetrates through a hole 49A of the first wheel member 49 fixed to the casing 30 via the bolt 47, and is drawn to the outside of the wheel 50. The first wheel member 49 is connected and fixed to a second wheel member 53 via a lock ring 64.

In addition, the reduction mechanism G1 is sealed by an oil seal 62 disposed on the outside in the axial direction of the angular ball bearing 48, an O-ring 31 disposed in a groove 30D formed in a receiving surface 30C of the outer race of the angular ball bearing 48 of the casing 30, and an O-ring 41 disposed between a cover body 45 mounted via a bolt to the end portion of the casing 30 on the side opposite to the vehicle body, and the casing 30.

In this embodiment, as the lock ring 64 is present, the first wheel member 49 protrudes inward from this part in the radial direction. On the other hand, the angular ball bearing 48 and the oil seal 62 are disposed on the inside in the diameter direction of the lock ring 64 of the first wheel member 49 of the wheel 50. Therefore, there is a limitation to a further arbitrary increase in the outer diameter of the casing 30 at this part.

Here, this embodiment, the following construction is employed.

Referring to FIG. 1, the angular ball bearing 48 includes an independent dedicated outer race 70, a ball 72 as a rolling element, and an independent dedicated inner race 73.

The outer race 70 of the angular ball bearing 48 has a main body portion 74, and an extending portion 76 which extends from the main body portion 74 toward the vehicle body side in the axial direction and of which the outer periphery is exposed from the casing 30.

The main body portion 74 of the outer race 70 is disposed so that the outer periphery abuts on two surfaces including a disposition surface 30B (parallel to the axial center O1) of the inside of the casing 30 and the receiving surface 30C continuing from the disposition surface 30B and extending at right angle with respect to the axial center O1. The main body portion 74 has a rolling surface 74A for the ball 72, a rolling surface extension portion 74B extending from the rolling surface 74A toward the oil seal 62, and a protruding portion 74C protruding from the end portion of the main body portion 74 on the side opposite to the oil seal.

The extending portion 76 of the outer race 70 extends toward the vehicle body side in the axial direction from the main body portion 74 to have a greater diameter in a hook shape. That is, the outer diameter d4 of the extending portion 76 is greater than the outer diameter d1 of the main body portion 74, and the extending portion 76 and the casing 30 overlap by (d4−d1) as viewed in the axial direction. The extending portion 76 has a mounting surface 76A for the oil seal 62. The inner diameter D3 of the mounting surface 76A is greater than the inner diameter D2 of the rolling surface extension portion 74B extending from the rolling surface 74A of the main body portion 74 of the outer race 70.

The oil seal 62 is disposed to abut on the mounting surface 76A of the extending portion 76 and on the flange body 34 which is a member rotating relative to the casing 30 in between. The inner diameter D1 of the oil seal 62 is greater than the outermost diameter d3 of the inner race 73. This is because assembly of the flange body 34 from the left of FIGS. 1 and 2 in a state of the inner race 73 being assembled while the outer race 70, the ball (rolling element) 72, and the oil seal 62 are assembled into the casing 30 is intended. Therefore, the flange body 34 has an oil seal surface 34E having a diameter (the diameter corresponding to the inner diameter D1 of the oil seal 62) greater than the outer diameter d2 of the disposition surface 34B of the inner race 73 of the angular ball bearing 48.

In addition, in this embodiment, as described above, since the inner diameter D1 of the oil seal 62 is greater than the outermost diameter d3 of the inner race 73, it is difficult to ensure the height needed for the oil seal 62. However, as described above, by causing the outer diameter d4 of the extending portion 76 to be large enough to overlap the casing 30 as viewed in the axial direction, the large inner diameter D3 of the mounting surface 76A of the oil seal 62 is ensured, so that the height t5 needed for the oil seal 62 is achieved.

The actions and effects of setting the magnitudes of the dimensions will be described later.

In this embodiment, the angular ball bearing 48 and the tapered roller bearing 46 have contact angles (angles of the straight lines (the lines of action) connecting the rolling elements and the outer and inner races with respect to the diameter direction) θ1 and θ2 that are not zero and are assembled back to back.

Therefore, the point P1 of intersection between the line F1 of action of the angular ball bearing 48 and the outer periphery of the casing 30 is offset toward the side opposite to the vehicle body from the center 48C1 in the axial direction of the angular ball bearing 48 by δ1. On the other hand, in this embodiment, since the output member is the casing 30 of the reduction mechanism G1 (so-called a frame rotation-type reduction device), the casing 30, the first and second wheel members 49 and 53, and the wheel (tire) 50 do not relatively rotate but integrally rotate. Therefore, there is no offset in the rotational phase between these members. Therefore, in a region further toward the vehicle body side than an area A1 (a face at right angle to the shaft of the wheel member 49) of FIGS. 1 and 2, as described above, the cutoff 30A is formed in only the part of the outer periphery of the casing 30 where the tube 60 for air injection is disposed, and the hole 49A of the first wheel member 49 is formed.

With this configuration, a part of the casing 30 according to this embodiment to the point P1 of intersection between the outer periphery of the casing 30 and the line F1 of action is maintained at a large thickness t1 toward the oil seal 62 so as to sufficiently receive the load from the angular ball bearing 48, and a part thereof on the outside in the radial direction of the receiving surface 30B of the outer race 70 is also maintained at a large thickness t2. In other words, on the line F1 of action of the angular ball bearing 48, both the outer race 70 of the angular ball bearing 48 and (the thick parts of) the casing 30 supporting the outer race 70 are positioned. On the other hand, on a side further toward the oil seal 62 than the point P1 of intersection, the thickness of the casing 30 is gradually and linearly reduced from t2 to t3 toward the end portion on the vehicle body side in the axial direction from a position P2 close to the point P1 of intersection, so that interference between the casing 30 and the first wheel member 49 in the vicinity of the lock ring 64 is effectively avoided.

In addition, the internal pins 28A constituting the internal teeth of the internal gear 28 and the holding pin groove (the assembly groove of the internal pins) 28D of the holding pin 28C of the internal pin 28A are positioned on the inside (on the inner side with respect to the entirety of the reduction mechanism: in this embodiment, on the side opposite to the vehicle body in the axial direction) in the axial direction of the receiving surface 30C. In other words, in this embodiment, the angular ball bearing 48 is adjacent to the internal pin 28A of the internal gear 28 or the holding pin groove 28D of the holding pin 28C penetrating through the internal pin 28A. Therefore, the position in the axial direction of the holding pin 28C of the internal gear 28 is restricted by the protruding portion 74C of the main body portion 74 of the outer race 70 (the protruding portion 74C is used as a position restriction member of the holding pin 28C).

Hereinafter, the action of the reduction mechanism G1 according to this embodiment is described.

The rotation of the output shaft 12A of the motor 12 is transmitted to the input shaft 16 of the reduction device G1 via the spline 14. When the input shaft 16 is rotated, (the outer peripheries of) the eccentric bodies 18 and 20 do eccentric movement, and the external gear 24 and 26 are oscillated via the bearings 21 and 23. Due to this oscillation, there is a phenomenon in which the positions of engagement between the external gears 24 and 26 and the internal gear 28 are sequentially offset.

The difference between the external gears 24 and 26 and the internal gear 28 in the number of teeth is set to 1, and the rotation of each of the external gears 24 and 25 is restricted by the inner pin 40 fixed to the vehicle body frame 32 side. Therefore, whenever the input shaft 16 is rotated once, the internal gear 28 is rotated by the difference in the number of teeth with respect to the external gears 24 and 26 of which the rotation is restricted.

As a result, by the rotation of the input shaft 16, the casing 30 integrated into the internal gear main body 28E is rotated at a rotation speed reduced to 1/(the number of teeth of the internal gear). By the rotation of the casing 30, the wheel (tire) 50 of the forklift truck 51 is rotated via the first wheel member 49 fixed to the casing 30 (by the bolt 47).

Here, in this embodiment, the outer race 70 of the angular ball bearing 48 and the oil seal 62 are positioned on the inside in the diameter direction of the lock ring 64 connecting the first and second wheel members 49 and 53 of the wheel 50. Generally, in the case where an oil seal is disposed on the inside in the radial direction of a casing, in order to enable a bearing to be assembled to the inside in the axial direction of the oil seal, the inner diameter of an oil seal disposition surface of the casing needs to be greater than the outer diameter of the outer race of the bearing. In addition, in order to ensure the strength of the casing, the casing needs to be a predetermined thickness. Therefore, as in this embodiment, in the case where the outer diameter of the casing is limited by a wheel member or the like in the vicinity of a lock ring, in a method according to the related art, the outer diameter of the outer race (the diameter of the bearing) is necessarily reduced, and the transmission capacity that can be achieved is reduced.

However, according to the embodiment of the present invention, since the outer race 70 of the angular ball bearing 48 extends to dispose the oil seal 62 inside the extending portion 76 exposed from the casing 30, the outer diameter d1 (the main body portion 74 of the outer race 70) of the angular ball bearing 48 is not influenced by the inner diameter D3 of the mounting surface 76A of the oil seal 62. Therefore, (the main body portion 74 of the outer race 70 of) the angular ball bearing 48 may have the large outer diameter d1, so that a greater transmission capacity may be achieved.

In addition, (since the casing 30 is not present on the outside in the radial direction of the extending portion 76) the outer diameter d4 of the extending portion 76 may be greater than the outer diameter d1 of the main body portion 74, and thus the sufficient thickness t4 of the extending portion 76 may be achieved. However, since the extending portion 76 of the outer race 70 of the angular ball bearing 48 is made of a material with a higher strength than that of the casing 30 (for example, if needed for a disposition relationship), the thickness t4 of the extending portion 76 of FIGS. 1 and 2 may be reduced on the other hand, thereby further reducing the outer diameter d4 of the extending portion 76.

Moreover, the actions and effects are obtained by the above construction as follows.

For example, the thickness t2 of the casing 30 may be gradually reduced from the vicinity of the point P1 of intersection between the line F1 of action of the angular ball bearing 48 and the outer periphery of the casing 30, and as a result, the thickness t2 is significantly reduced to the thickness t3 on the oil seal 62 side of the main body portion 74 of the outer race 70. This point is now described in detail. In this embodiment, as the angular ball bearings 48, the angular ball bearing 48 (and the tapered roller bearing 46) of which the contact angles are not zero (the line F1 of action is inclined with respect to the diameter direction) are employed, and are assembled back to back.

Therefore, the point P1 of intersection between the outer periphery of the casing 30 and the line F1 of action may be shifted to the side opposite to the vehicle body in the axial direction from the center 48C1 in the axial direction of (the ball 72) of the angular ball bearing 48 by δ1. In other words, with the shift of δ1, on the line F1 of action of the angular ball bearing 48, both the outer race 70 of the angular ball bearing 48 and (the thick parts of) the casing 30 supporting the outer race 70 are positioned, so that a sufficient strength is achieved. As a result, the thickness of the casing 30 is able to be gradually reduced from t2 to t3 from the position P2 further toward the side opposite to the vehicle body than the center 48C1 in the axial direction of the angular ball bearing 48, and due to this, interference between the casing 30 and the lock ring 64 may be more reliably avoided.

In addition, in the case where the outer race (or the inner race) is simply omitted with the intention of reducing the dimensions in the diameter direction of the reduction mechanism, in order to ensure the hardness of the rolling surface corresponding to the casing or the flange body, heat treatment (surface hardening) or the like has to be performed. However, in this embodiment, since the outer race 70 and the inner race 73 are independent, there is no need to perform heat treatment on the disposition surface 30B or the receiving surface 30C of the outer race 70 to form the rolling surface on the casing 30 or the flange body 34. Therefore, regardless of the configuration in which the reduction mechanism G1 is a planetary gear reduction mechanism and the holding pin groove (the assembly groove of the internal pins 28A) 28D supporting (the holding pin 28C holding) the internal pins 28A constituting the internal teeth of the internal gear 28 are positioned on the inside in the axial direction of the receiving surface 30C of the casing 30, thermal strain of the holding pin groove 28D may be prevented. These actions and effects may be achieved even by a construction in which the internal teeth of the internal gear are directly formed on the internal gear main body (casing) but not by the internal pin.

Moreover, by forming the protruding portion 74C on the main body portion 74 of the outer race 70 by applying the fact that the outer race 70 is present, the protruding portion 74C may be applied to determine the position of the holding pin 28C.

In addition, since the inner diameter D1 of the oil seal 62 is greater than the outermost diameter d3 of the inner race 73, the flange body 34 having the inner race 73 assembled in the state where the outer race 70, the ball (rolling element) 72, and the oil seal 62 are assembled into the casing 30 may be assembled from the left of FIGS. 1 and 2. Therefore, assembly is easy.

In addition, in this embodiment, as the casing 30 positioned on the outside of the flange body 34 is rotated (due to an outer race rotational load), the inner race 73 may be assembled into the flange body 34 through a clearance fit or a transition fit. Therefore, from this point of view, assembly is easy.

In addition, in the case where the inner diameter D1 of the oil seal 62 is greater than the outermost diameter d3 of the inner race 73, ensuring the large dimension (height) t5 in the radial direction of the oil seal 62 itself becomes difficult. However, in this embodiment, since the inner diameter D3 of the mounting surface 76A of the oil seal 62 of the extending portion 76 is greater than the inner diameter D2 of the rolling surface extension portion 74B extending from the rolling surface 74A of the main body portion 74 of the outer race 70, the height t5 needed for the oil seal 62 is reliably achieved.

In addition, regarding the outer diameter d4 of the extending portion 76, since the casing 30 is not present on the outside of the extending portion 76, the thickness of the extending portion 76 may be ensured to be greater than the thickness t4 of FIGS. 1 and 2 by increasing the outer diameter d4, or conversely, (since the strength of the material of the extending portion 76 is high) may be reduced to be slightly smaller than the thickness t4 of FIGS. 1 and 2 so as to further reduce the outer diameter d4 depending on the circumstances.

This may be a synergistic effect obtained by actively applying the construction in which the oil seal 62 is disposed between the extending portion 76 of the outer race 70 with a high degree of freedom in shape design and the flange body 34.

In addition, in the above embodiment, the angular ball bearing 48 and the oil seal 62 are positioned on the inside in the diameter direction of the lock ring 64 of the wheel 50 and thus the embodiment of the present invention is applied to avoid "a spatial interference that is generated by a relationship with the lock ring". However, the embodiment of the present invention is not limited only to the application to the spatial interference with the lock ring and may also be applied to a disposition relationship with other specific members. Moreover, particularly, regardless of other specific members, the embodiment of the present invention may be applied for the purpose of a wider space and achieving a higher transmission capacity while maintaining the dimensions in the diameter direction of the bearing (between the casing and the relative rotation member) and the vicinity of the oil seal disposed to be adjacent to the bearing at a low level.

In addition, in the above embodiment, as the reduction mechanism G1, the eccentric oscillation-type planetary gear mechanism having the eccentric bodies 18 and 20 on the input shaft 16 disposed at the center of the external gears 24 and 26 is employed. However, in the present invention, the construction of the reduction mechanism is not particularly limited. For example, an eccentric oscillation-type planetary gear mechanism may also be employed in which an external gear is oscillated as a plurality of eccentric body shafts are simultaneously rotated at a position offset from the center of the external gear. In addition, a simple planetary gear reduction mechanism, a parallel shaft reduction mechanism, an orthogonal shaft reduction mechanism, or the like may also be employed, and a combination thereof may also be employed.

In addition, regarding the internal gear, in the above embodiment, the internal gear is constructed to have the internal pins constituting the internal teeth. However, the present invention is not limited to this, and a construction may be employed in which the internal teeth are directly formed on the internal gear main body (casing). As described above, even in this case, since the outer race is an additional member, a problem of thermal strain in the internal teeth may be avoided.

In addition, regarding the bearing, in the above embodiment, the angular ball bearing 48 (with the contact angle of θ1) of which the contact angle is not zero is employed. However, in the present invention, the type of the bearing is not particularly limited. For example, like the tapered roller bearing 46 on the side opposite to the vehicle body in the embodiment, a bearing using a "conical roller" as the rolling element may be employed. Moreover, a typical ball bearing having a contact angle of zero or a roller bearing may also be employed.

In addition, in the above embodiment, the protruding portion 74C is provided in the main body portion 74 of the outer race 70 and the protruding portion 74C has the function of determining the position in the axial direction of the peripheral members (the holding pin 28C holding the internal pins 28A constituting the internal teeth of the internal gear 28). However, the outer race according to the present invention may not necessarily have such a construction.

In addition, in the above embodiment, since the inner diameter D3 of the mounting surface 76A of the oil seal 62 of the extending portion 76 is greater than the inner diameter D2 of the rolling surface extension portion 74B extending from the rolling surface 74A of the main body portion 74 of the outer race 70. However, the magnitude relationship between the inner diameter of the rolling surface extension portion extending from the rolling surface of the outer race and the inner diameter of the mounting surface of the oil seal may not be particularly set to the "relationship of D2<D3" as in the above embodiment, and for example, the rolling surface extension portion of the outer race may be used as the inner diameter of the mounting surface of the oil seal as it is.

In addition, in the above embodiment, regarding the inner race side, the independent inner race 73 is provided. However, in the present invention, the independent inner race is not necessarily required of the inner race, and the inner race may be integrated into a flange member. In addition, regardless of whether or not the inner race is integrated, the construction in which the inner diameter of the oil seal is greater than the outermost diameter of the inner race is not always necessary (for example, depending on the constructions of other members).

In addition, in the above embodiment, the construction is employed in which the casing 30 is rotated and the flange body 34 which is the relative rotation member is fixed to the vehicle body frame 32. However, a construction may also be employed in which the casing is fixed to the vehicle body frame and the relative rotation member (in the above embodiment, the flange body 34 and the carrier body 38) is rotated. In this case, the wheel is integrated into the relative rotation member.

In addition, in the above embodiment, the overall length in the axial direction of the reduction mechanism G1 is disposed on the inside of the wheel 50. However, in the present invention, at least a part of the overall length may be on the inside of the wheel. Here, in the case where the outer race of the bearing (in the above embodiment, the angular ball bearing 48) is on the inside of the wheel, the present invention is particularly effective, and in the case where the outer race is disposed on the inside of a member protruding inward in the diameter direction compared to other parts such as the lock ring of the wheel member, the present invention is further effective.

In addition, in the above embodiment, the oil seal 62 directly abuts on the flange body 34. However, the present invention is not limited to this, and for example, a collar (mounted to the flange body 34) may be provided between the oil seal 62 and the flange body 34. In this case, the collar corresponds to the relative rotation member.

In addition, in the above embodiment, the example in which the wheel driving device according to the present invention is applied to the forklift truck is described. However, the wheel driving device according to the present invention may be widely applied to vehicles and the like other than the forklift truck.

It should be understood that the invention is not limited to the above-described embodiment, but may be modified into various forms on the basis of the spirit of the invention. Additionally, the modifications are included in the scope of the invention.

What is claimed is:

1. A wheel driving device comprising:
a reduction mechanism of which at least a part is disposed on an inside of a wheel;
a casing;
a relative rotation member rotating relative to the casing;
a first bearing disposed between the casing and the relative rotation member; and
an oil seal sealing a space where the reduction mechanism is present,
wherein a first outer race of the first bearing includes a main body portion of which an outer periphery is disposed on an inside of the casing, and an extending portion which extends from the main body portion in an axial direction and of which an outer periphery is exposed from the casing,
the oil seal abuts on the extending portion and the relative rotation member, and
an outer diameter of a portion at which the oil seal is disposed in the extending portion is larger than an outer diameter of the main body portion.

2. The wheel driving device according to claim 1, wherein the first outer race of the first bearing is disposed on the inside of the wheel in a diameter direction.

3. The wheel driving device according to claim 2, wherein the first outer race of the first bearing is disposed on the inside of the wheel in a diameter direction of a lock ring of a wheel member of the wheel.

4. The wheel driving device according to claim 1, wherein the reduction mechanism is a planetary gear reduction mechanism which includes a planetary gear and an internal gear that makes internal contact and meshes with the planetary gear,
the casing has a receiving surface of the first outer race of the first bearing, and
internal teeth of the internal gear or an assembly groove of internal pins constituting the internal teeth are disposed on an inside in the axial direction of the receiving surface.

5. The wheel driving device according to claim 4, further comprising a holding pin that penetrates through, and configured to rotatably hold, the internal pins,
wherein the first outer race comprises a protruding portion protruding from an end portion of the main body portion on a side opposite to the oil seal, and
wherein the protruding portion is configured to restrict the holding pin of the internal gear.

6. The wheel driving device according to claim 1, wherein the relative rotation member is fixed to a frame on a vehicle body side and the wheel is driven as the casing is rotated relative to the relative rotation member,
the first bearing has an independent dedicated first inner race, and
the first inner race is assembled into the relative rotation member by a clearance fit.

7. The wheel driving device according to claim 1, further comprising a second bearing,
wherein the first bearing and the second bearing have contact angles that are not zero with respect to a diameter direction and a line of action of the first bearing, and with respect to a diameter direction and a line of action of the second bearing, respectively, and
the first outer race of the first bearing and the casing supporting the first outer race are disposed at least on the line of action of the first bearing.

8. The wheel driving device according to claim 1, wherein an outer diameter of the casing is reduced toward an end portion in the axial direction of the oil seal.

9. The wheel driving device according to claim 8, further comprising a second bearing,
wherein the first bearing and the second bearing have contact angles that are not zero with respect to a diameter direction and a line of action of the first bearing, and with respect to a diameter direction and a line of action of the second bearing, respectively, and the first outer diameter of the casing is reduced toward the end portion in the axial direction from a side further toward the oil seal from a point of intersection between an outer periphery of the casing and the line of action of the first bearing.

10. The wheel driving device according to claim 1, wherein an inner diameter of a mounting surface of the oil seal is greater than an inner diameter of a rolling surface extension portion extending from a rolling surface of the first outer race of the first bearing.

11. The wheel driving device according to claim 1, wherein the portion at which the oil seal is disposed in the extending portion and the casing overlap as viewed in the axial direction.

12. The wheel driving device according to claim 1, wherein the first inner race is separated from the relative rotation member.

13. The wheel driving device according to claim 12, wherein an inner diameter of the oil seal is greater than an outermost diameter of the first inner race.

14. The wheel driving device according to claim 1, wherein the casing comprises
a receiving surface of the first outer race of the first bearing that defines a groove, and
an O-ring disposed in the groove of the receiving surface.

* * * * *